(No Model.)
G. M. BEERBOWER.
POULTRY CARRIER.
No. 401,812. Patented Apr. 23, 1889.
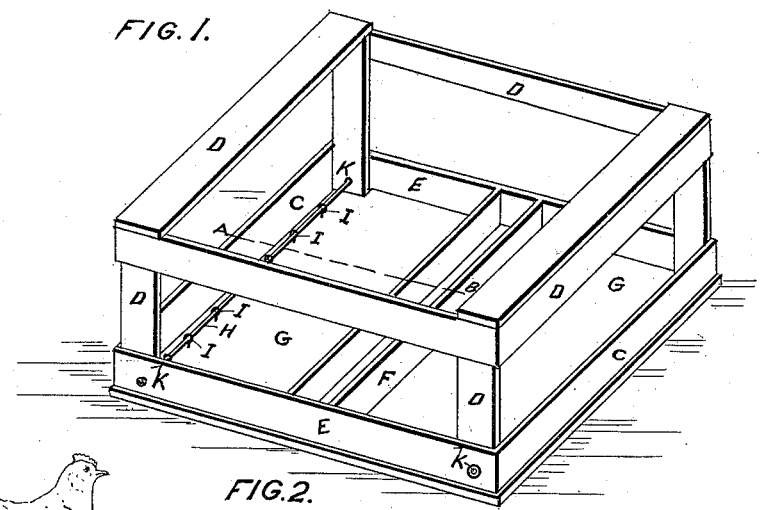
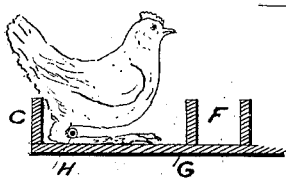
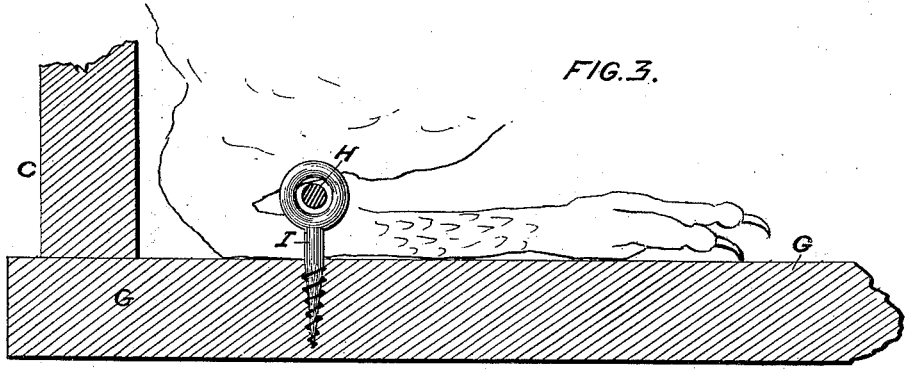
WITNESSES:
Fred G. Dieterich
Edw. W. Byrn.
INVENTOR:
Geo. M. Beerbower
BY Munn &
ATTORNEYS.

UNITED STATES PATENT OFFICE.

GEORGE M. BEERBOWER, OF CHERRY VALE, KANSAS.

POULTRY-CARRIER.

SPECIFICATION forming part of Letters Patent No. 401,812, dated April 23, 1889.

Application filed January 18, 1888. Renewed October 1, 1888. Serial No. 286,894. (No model.)

*To all whom it may concern:*

Be it known that I, GEORGE M. BEERBOWER, of Cherry Vale, in the county of Montgomery and State of Kansas, have invented a new and useful Improvement in Poultry-Carriers, of which the following is a specification.

The object of my invention is to provide an improved poultry-carrier of a skeleton form, so as to admit of free circulation of air through it, and in which live poultry may be stored and shipped without danger of part of the fowls being suffocated by others crowding upon them, and also to provide a means by which they may conveniently be given food and water while in store or in transit, with assurance that every fowl may have access to it. I attain these ends by means of the device illustrated in the accompanying drawings, in which similar letters refer to similar parts throughout the several figures.

Figure 1 is a perspective view of the device. Fig. 2 is a sectional view taken through the line A B, Fig. 1, showing a fowl secured in position; and Fig. 3, a view of the same section and drawn to a larger scale, showing the manner in which the fowl is secured to the carrier.

The frame C D E is made in a substantial manner of sufficient height to protect the poultry from being crushed in case the carriers are placed in piles one above another. The floor G is made tight to prevent any dirt falling through upon fowls in the carrier below.

F is a trough, in which food and water may be placed.

H I is the device by which the fowls are secured in the carrier. This consists of a series of eyes, hooks, staples, or similar devices secured to the bottom G near the frame-piece C (or secured to frame-piece C near the bottom G) at a distance of a few inches apart in a row on each side of the carrier, as shown in Fig. 1. Through these eyes I may pass a wire, H, or a cord, strap, chain, or other similar article, to secure the fowls in the carrier. The cord or wire being withdrawn, the fowls are placed in position, as shown in Fig. 2, with heads toward the trough F in the center of the carrier. The first joint of the fowl's legs is laid flat upon the floor between two of the projecting eyes I I. The wire or cord H is then passed through the eyes, over the legs of the fowl, and the ends through the holes $k$ in the frame-piece E, and are knotted or secured, so as to prevent being pulled out. The frame-piece C being behind the knees of the fowls prevents them from slipping their legs from under the wire or cord H, so they are held securely in one position till released, which is done by simply undoing the knot in the cord or wire H and withdrawing the same from the holes in the frame and the eyes I.

The storing and shipping of live poultry is attended with loss, owing to fowls crowding upon each other when kept in ordinary coops, and many frequently perish for want of water or food, which cannot be placed within the reach of all in a coop when they are crowded into every conceivable position.

Having thus described my invention, what I claim as new is—

1. The combination, with a poultry coop or carrier, of a series of eyes or staples, I, and a wire, cord, or rod, H, passing through the same, for securing the legs of the fowls, substantially as and for the purpose described.

2. The combination, with a poultry coop or carrier, of the eyes or staples I and the wire, cord, or rod H, for securing the legs of the fowls, and a board or strip, C, arranged immediately in rear of the eyes, to hold the joints of the fowls against dislodgment, substantially as and for the purpose described.

3. A poultry coop or carrier having the eyes I and wire, cord, or rod H, and a strip, C, on one side and trough F on the other, substantially as and for the purpose described.

GEORGE M. BEERBOWER.

Witnesses:
 WM. T. STETCHER,
 F. A. JEWELL.